W. M. REMINGTON.
AUTOMOBILE FUEL CONTROL DEVICE.
APPLICATION FILED SEPT. 13, 1912.
1,246,157.
Patented Nov. 13, 1917.
2 SHEETS—SHEET 1.
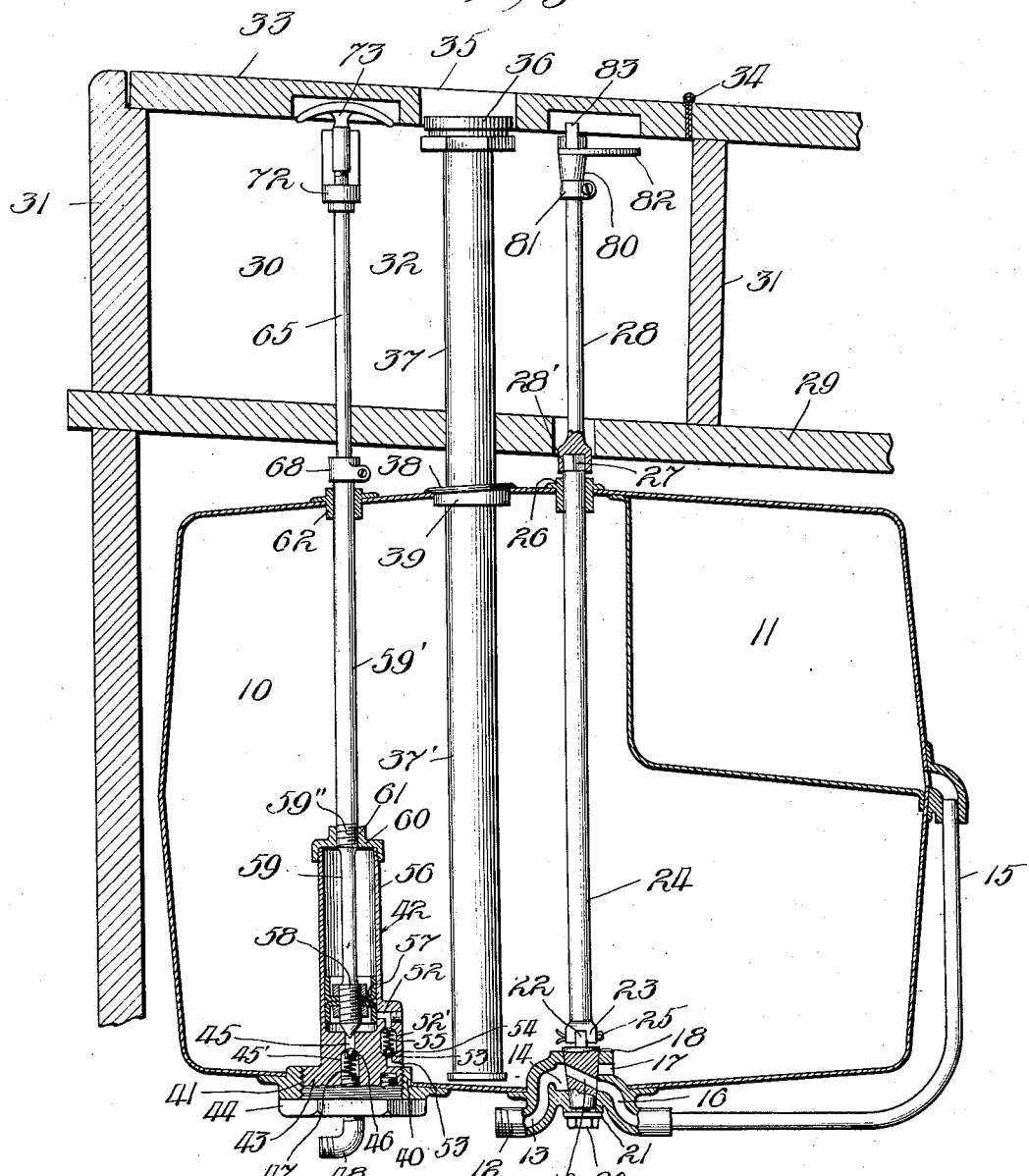
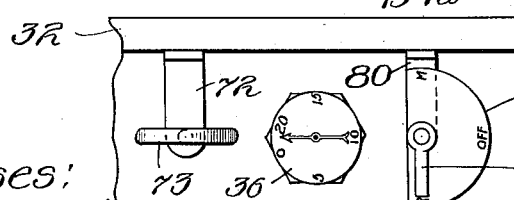
Witnesses:
Harry S. Gaither
Ursula L. Walton
Inventor:
William M. Remington.
By Sheridan, Wilkinson, Scott & Richmond
Attys W. M. REMINGTON.
AUTOMOBILE FUEL CONTROL DEVICE.
APPLICATION FILED SEPT. 13, 1912.
1,246,157.
Patented Nov. 13, 1917.
2 SHEETS—SHEET 2.
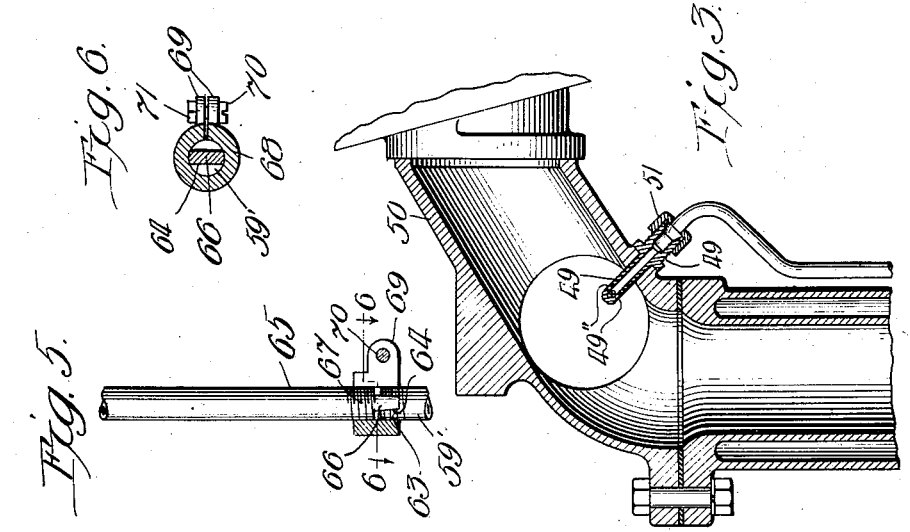
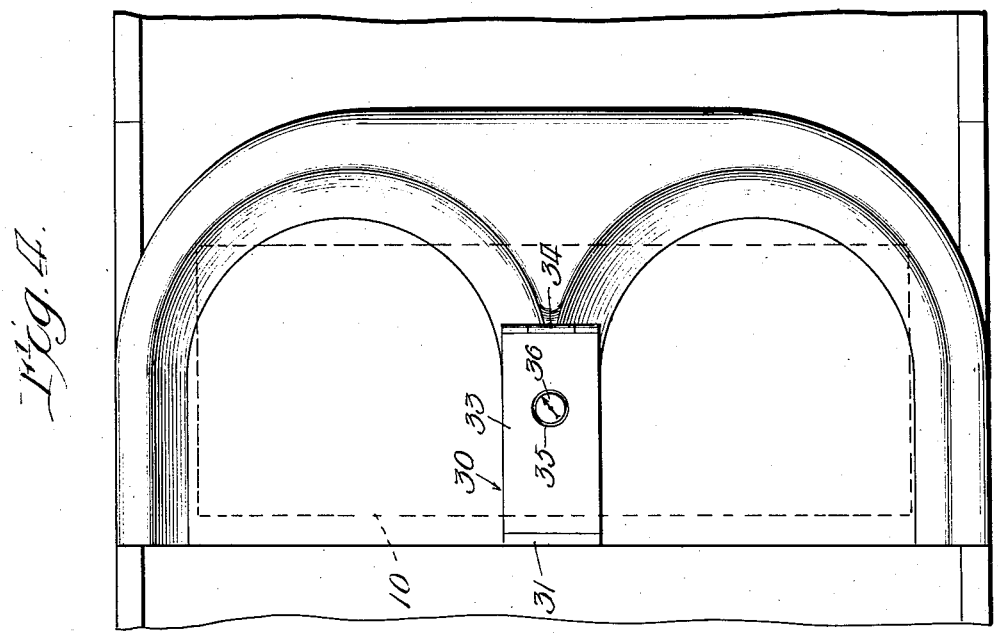

UNITED STATES PATENT OFFICE.

WILLIAM M. REMINGTON, OF SPRINGFIELD, MASSACHUSETTS, ASSIGNOR TO STEVENS-DURYEA COMPANY, OF CHICOPEE FALLS, MASSACHUSETTS, A CORPORATION OF MASSACHUSETTS.

AUTOMOBILE-FUEL-CONTROL DEVICE.

1,246,157.

Specification of Letters Patent.

Patented Nov. 13, 1917.

Application filed September 13, 1912. Serial No. 720,179.

*To all whom it may concern:*

Be it known that I, WILLIAM M. REMINGTON, a citizen of the United States, residing at Springfield, in the county of Hampden and State of Massachusetts, have invented certain new and useful Improvements in Automobile-Fuel-Control Devices, of which the following is a specification.

This invention relates to improvements in fuel storage and control apparatus for automobiles.

The object of my invention is to provide an improved construction which will provide for the accessible storage of fuel in an automobile or other vehicle. Another object is to provide devices for the control of such fuel and the distribution thereof. Still another object is to provide for the location of said control devices so as to render them especially accessible to the operator of such vehicle. Other objects will be made apparent and set forth in the following specification and accompanying drawings, in which—

Figure 1 is a transverse cross section through a fuel tank showing the controlling devices partially in elevation.

Fig. 2 is a detail plan view of the controlling devices.

Fig. 3 is a sectional detail view showing the means of spraying the fuel in the manifold.

Fig. 4 is a plan view of the seats of a vehicle showing the fuel tank in dotted lines located therebeneath.

Fig. 5 is a detail view showing the fastening means; and

Fig. 6 is a cross section taken along the lines 6—6 of Fig. 5.

Like numerals refer to like elements throughout the drawings, wherein—

10 designates a fuel tank, having located in its interior a reserve compartment 11 adapted to contain a reserve supply of fuel for use when the operator of a vehicle has unexpectedly exhausted the main supply. An outlet pipe 12 leads from the interior of the tank and is in communication with the duct 13, enlarged at its extremity to form the aperture 14, as shown in Fig. 1. An outlet pipe 15 leads from the reserve compartment and communicates with the duct 16, communicating with the interior of the tank.

Located above the duct 16 is a short passage or duct 17. A tapered valve 18, provided with a diagonally extending passage 19, is seated in the casting in which are located the above named ducts. The passage 19, located in the valve 18, is so constructed as to furnish a continuous passage from the duct 16 to the duct 13 when in the position shown in Fig. 1, and from the duct 17 to the duct 13 when turned to a position 180° from that shown. The enlarged extremity 14 of the duct 13 provides for communication with the passage 19 when the valve is in either of the two enumerated positions. When the valve 18 is turned 90° in either direction from the position shown in Fig. 1, communication is closed between all of the ducts.

It will be apparent that when the valve is in the position shown in Fig. 1 fuel from the reserve compartment will flow through the pipe 15, duct 16, passage 19, and out through the duct 13 and pipe 12, ordinarily leading to the carbureter or generating valve. When the valve is rotated to a position 180° from that shown, communication will be established from the interior of the tank through the duct 17 to the passage 19, and out through the duct 13 and pipe 12, thus furnishing a supply of fuel from the main portion of the tank. As stated above, to cut off both of these supplies the valve is rotated to a position 90° in either direction from that shown. It will thus be apparent that I have provided a main and reserve supply of fuel, each adapted to be used independently of each other.

Inasmuch as I have located the compartment 11 in the upper portion of the tank, it will be apparent that should the supply of fuel in the main portion of the tank be decreased to such an extent that when climbing a hill the carbureter will lack sufficient fuel, it will be possible to utilize the supply in the reserve compartment. The tapered valve 18 is seated in a tapered seat and is retained in position therein by a nut 20 and washer 21. An apertured lug 22 extends upwardly from the upper portion of the valve, and is engaged by bifurcated lugs 23 of an operating rod 24, a collar pin 25 serving to hold the lugs 23 in engagement with the lug 22. This operating rod projects at its upper portion through a bushing 26 in the top of the tank, and is provided with a square head adjacent the top of the tank. A second rod 28 is provided with a squared socket 28' adapted to closely fit and engage the head 27. A second rod extends up through a partition 29, which forms the covering for the tank and may be used as a cushion support for the seats of the vehicle. A compartment 30 is provided, having the partition 29 for a bottom, the front and back walls 31, and the side walls 32. A cover 33 is hinged at 34 to provide a covering for the box-like compartment 30. This cover is preferably provided with an aperture 35, within which is located the dial or indicating portion 36 of a fuel gage 37. This gage is of a type generally tubular in form and capable of separation adjacent the point 38, at which point the gage projects downwardly through the bushing or collar 39 in the top of the tank. The lower portion 37' of the gage extends downwardly to a point in close proximity with the bottom of the tank, and is preferably situated with its vertical axis perpendicular to and passing through a point adjacent the intersection of the major and minor axes of the tank. By so locating the gage, it will be apparent that the inclination of the level in the tank—due to the climbing or descending of a grade by a vehicle—will not affect the accurate reading of the gage, since the mean depth of the fuel in said tank will be approximately indicated.

Secured to the bottom of the tank is the collar or brushing 40, centrally apertured and threaded at 41. The pump member 42, having an enlarged base 43 externally threaded to engage the threaded portion 41 of the bushing, is located within the tank. The base of this pump member is formed with a hexagonal or similar head 44, by which the same may be engaged to secure it in position or remove it therefrom. This pump is provided with a downwardly extending outlet 45, enlarged at its lower portion 45', in which enlarged portion is carried a ball 46, normally seated to close the opening 45 by means of a spring 47. This enlarged portion is adapted to communicate with the pipe 48, which, in turn, leads to a nozzle member 49, preferably located with its extremity 49' projecting into the intake manifold 50 of the vehicle. This extremity is provided with apertures 49" pointing in the several directions of the branches of the said manifold as shown in Fig. 3. A threaded collar 51 engages the nozzle member and serves to retain the extremity of the pipe 48 in engagement therewith.

A second angularly disposed passage 52 is provided in the base of the pump, this passage being downwardly extended and enlarged at 52', and again decreased at 53, to form a shoulder 53', against which is seated a ball 54, normally retained in seated position by the spring 55. This passage 52 communicates at one extremity with the interior of the pump cylinder 56 and at the other with the interior of the tank. Reciprocating in the pump cylinder is the piston 57, threadedly engaging the enlarged threaded portion 58 of the pump rod 59.

Threadedly engaging the top of the cylinder 56 is the cylinder cap 60, centrally apertured and threaded at 61. The rod 59 is provided with an enlarged portion 59' having its lower portion threaded at 59" to engage with the threaded portion 61 of the cylinder cap. The enlarged portion 59' at its upper end projects through a bushing or collar 62 secured to the top of the tank. The rod 59 is threaded at said upper extremity at 63 and is slotted, as indicated at 64. An operating rod 65 projects downwardly through the partition 29, and is provided with a depending lug 66 adapted to seat in the slot 64 of the rod, as shown in Figs. 5 and 6. The lower portion of this rod 65 is also threaded at 67, similarly to the threaded portion 63 of the rod 59. The extremities of both said rods are of the same diameter. A split collar 68 circles the threaded extremities 63 and 67, and is internally threaded to engage the same. This collar is provided adjacent its split portion with the shoulders 69, apertured and adapted to be held together by a small screw bolt 70 and nut 71.

In assembling this device, when the lug 66 at the extremity of the rod 65 is inserted in the slot 54 of the rod 59', the split cap 68 is threaded into engagement with both said rods and clamped in locking position by means of the bolt 70. It will be apparent that the rotation or reciprocation of the rod 65 will transmit a like motion to the rod 59. The rod 65 extends upwardly in the box-like compartment 30, and is journaled in the bracket 72 extending outwardly from the side 32 of the compartment 30. An operating handle 73 engages the upper extremity of the rod 65.

It will be apparent that upon lifting the cover 33, the handle 73 may be rotated to disengage the threaded portion 59" of the rod 59 from engagement with the cylinder cap. After such disengagement the handle 73 may be reciprocated to reciprocate the piston 57 in the cylinder 56, whereupon, upon upward stroke thereof, fuel will be drawn in through the aperture 52, and upon the downward stroke thereof the same fuel will be forced out through the aperture 45 to and through the nozzle 49 to enrich the air in the manifold 50 previous to its admission to the engine.

The enlarged portion 59" of the rod 59 will limit the downward reciprocation of the piston 57. The lower extremity of the enlarged portion 58 of the rod 59 is tapered at 58' to form an additional closure for the passage 45 when said rod is in the position shown in Fig. 1. A bracket 80 extends outwardly from the side 32 of the box 30 and provides a journal for the rod 28, which is provided beneath said bracket with a split clamp or collar 81 to prevent reciprocation of the rod 28. A dial 82 is carried by the bracket 80 beneath the operating handle 83, which is secured to the upper end of the rod 28. This handle serves not only as an operating means to rotate the rod 28, but also as an indicator in combination with the dial to indicate the position of the valve 18.

It will be apparent from the above description that I have provided a fuel tank located in advantageous position below the seats of the vehicle, said tank being constructed with a reserve compartment, as above described, and with a gage, a valve-controlling means, and a priming means, all separable adjacent the top of said tank, so that the latter may be readily removed from its position beneath the partition 29, and all of the said controlling and communicating devices being located adjacent the driver of the vehicle in such a manner that he may readily prime the cylinders for starting, control the flow of fuel from either of the tanks, or ascertain the contents of the tank without the necessity of moving from driving position. These advantages will be readily recognized by those skilled in the operation of such a vehicle, and further description of the operation of my device is not therefore deemed necessary.

While I have shown and described my invention with more or less particularity, I do not wish to be restricted to such showing or description beyond the scope of the appended claims.

I claim:

1. In combination, a motor vehicle having an operator's seat, a fuel tank located beneath said seat, a discharge pipe leading from said tank, means to control the flow of fuel from said tank through said pipe, means to operate said controlling means, said operating means being located adjacent said operator's seat; a priming pipe leading from said fuel tank, priming means adapted to forcibly discharge fuel from said tank through said priming pipe, means to operate said priming means, said operating means being located adjacent said operator's seat, means to indicate the amount of fuel in said tank, said means having an indicator located adjacent said operator's seat, said indicating means and both of said operating means being arranged adjacent each other.

2. In combination with a vehicle having a cushion-carrying partition, a fuel tank located beneath said partition, a box-like compartment located above said partition and said tank, a priming pump located in said tank and having an operating rod located upwardly of said tank, a gage member projecting downwardly into said tank and having a portion projecting upwardly therefrom and a valve member adapted to control the flow of fuel from said tank, said valve member having an operating rod projecting upwardly from said tank, said pump operating rod, said upwardly projecting portion of said gage member, and said valve operating rod, all projecting upwardly into and terminating in said box-like compartment.

3. In combination with a vehicle having a cushion-carrying partition, a fuel tank located beneath said partition, a box-like compartment located above said partition and said tank, a priming pump located in said tank and having an operating rod located upwardly of said tank, a gage member projecting downwardly into said tank and having a portion projecting upwardly therefrom and a valve member adapted to control the flow of fuel from said tank, said valve member having an operating rod projecting upwardly from said tank, said pump operating rod, said upwardly projecting portion of said gage member, and said valve operating rod, all projecting upwardly into and terminating in said box-like compartment, said box-like compartment being located adjacent the driver's seat of said vehicle.

4. In combination with a vehicle having a driver's seat and a partition located beneath and forming a support for said driver's seat, a fuel tank located beneath said partition and having its top adjacent the under side of said partition, a priming member located in said tank and having a piston rod projecting through the top of said tank and terminating adjacent thereto, a gage member projecting downwardly into said tank, said gage member being separable adjacent the top of said tank, and a valve adapted to control the flow of fuel from said tank, the said valve being provided with a rod projecting through and terminating adjacent the top of said tank.

5. In combination with a vehicle having a driver's seat and a partition located beneath and furnishing support for said driver's seat, a fuel tank located beneath said partition, a box-like compartment located adjacent said driver's seat, a priming pump located in said tank, said pump being adapted to be operated by an operating rod and handle projecting upwardly into and located in said box-like compartment, said rod being journaled in a bracket, said bracket being secured to the side of said box-like compartment, a valve member adapted to control the flow of fuel from said tank, said valve member being operable by an operating rod projecting upwardly and terminating in said box-like compartment, said last named rod being journaled in a bracket, said bracket being secured to the side of said box-like compartment.

6. In combination with a vehicle having a driver's seat and a partition located beneath and furnishing support for said driver's seat, a fuel tank located beneath said partition, a box-like compartment located adjacent said driver's seat, a priming pump located in said tank, said pump being adapted to be operated by an operating rod and handle projecting upwardly into and located in said box-like compartment, said rod being journaled in a bracket, said bracket being secured to the side of said box-like compartment, a valve member adapted to control the flow of fuel from said tank, said valve member being operable by an operating rod projecting upwardly and terminating in said box-like compartment, said last named rod being journaled in a bracket, said bracket being secured to the side of said box-like compartment, a dial carried by said last named bracket, said dial being adapted to furnish an indicating means in combination with a handle carried by said operating rod.

7. In combination with a vehicle having a cushion carrying partition, a fuel tank located beneath said partition, a priming pump located in said tank and having an operating rod located upwardly of said tank, a gage member projecting downwardly into said tank and having a portion projecting upwardly therefrom and a valve member adapted to control the flow of fuel from said tank, said valve member having an operating rod projecting upwardly from said tank, said pump operating rod, said upwardly projecting portion of said gage member, and said valve operating rod, all projecting upwardly and terminating beneath said cushion carrying partition.

8. The combination in an automobile, of a fuel tank located beneath the seat of the automobile, a priming pump located in said tank and having an operating rod located upwardly of said tank, a gage member projecting downwardly into said tank and having a portion projecting upwardly therefrom, and a valve member adapted to control the flow of fuel from said tank, said valve member having an operating rod projecting upwardly from said tank, said pump operating rod, said upwardly projecting portion of said gage member, and said valve operating rod all terminating beneath said seat.

9. The combination in an automobile of a fuel tank located adjacent the seat of the automobile, a priming pump located in said tank and having an operating member located upwardly of said tank, and a gage member projecting downwardly into said tank and having a portion projecting upwardly therefrom, said pump operating means and said upwardly projecting portion of said gage member being located adjacent said seat.

10. The combination in an automobile of a fuel tank located adjacent the seat of the automobile, a priming pump located in said tank and having an operating member located upwardly of said tank, and a valve member adapted to control the flow of fuel from said tank, said valve member having an operating member projecting upwardly from said tank, said operating members of said priming pump and said valve being located adjacent said seat.

11. The combination in an automobile of a fuel tank located beneath the seat of the automobile, a priming pump located in said tank and having an operating member located upwardly of said tank adjacent said seat, a gage member projecting downwardly into said tank and having a portion projecting upwardly therefrom adjacent said seat, and a valve member adapted to control the flow of fuel from said tank, said valve member having an operating member located upwardly of said tank adjacent said seat.

In testimony whereof, I have subscribed my name.

WILLIAM M. REMINGTON.

Witnesses:
 W. H. WHITESIDE,
 E. I. FEVRINGER.